United States Patent [19]

Tsukamoto et al.

[11] Patent Number: 5,692,990
[45] Date of Patent: Dec. 2, 1997

[54] AUTOMATIC TRANSMISSION CONTROL APPARATUS

[75] Inventors: Kazumasa Tsukamoto; Yoshihisa Yamamoto; Akihito Iwata, all of Aichi-ken, Japan

[73] Assignee: Aisin AW Co., Ltd., Aichi-ken, Japan

[21] Appl. No.: 643,303

[22] Filed: May 8, 1996

[30] Foreign Application Priority Data

May 12, 1995 [JP] Japan ................... 7-138379

[51] Int. Cl.$^6$ ............................ B60K 41/20
[52] U.S. Cl. ................. 477/93; 477/71; 477/114; 477/901
[58] Field of Search ............... 477/92, 93, 71, 477/75, 114, 121, 901

[56] References Cited

U.S. PATENT DOCUMENTS

| | | | |
|---|---|---|---|
| 4,625,589 | 12/1986 | Nishikawa et al. | 477/92 |
| 4,625,591 | 12/1986 | Nishikawa | 477/93 |
| 4,644,826 | 2/1987 | Kubo et al. | |
| 4,648,289 | 3/1987 | Kubo et al. | |
| 4,719,821 | 1/1988 | Yagi et al. | 477/114 |
| 4,784,020 | 11/1988 | Hamano et al. | 477/114 X |
| 4,804,074 | 2/1989 | Kori | 477/901 X |
| 4,840,092 | 6/1989 | Sakaguchi et al. | 477/93 |
| 4,879,925 | 11/1989 | Taga et al. | |
| 5,148,721 | 9/1992 | Anan et al. | 477/121 X |
| 5,547,436 | 8/1996 | Hayabuchi et al. | 477/114 |
| 5,586,954 | 12/1996 | Iwata et al. | 477/93 |
| 5,598,335 | 1/1997 | You | 477/901 X |

FOREIGN PATENT DOCUMENTS

| | | |
|---|---|---|
| 0 139 982 A1 | 5/1985 | European Pat. Off. |
| 0 709 601 A2 | 5/1996 | European Pat. Off. |
| 59-029861 | 2/1984 | Japan. |
| 59-29861 | 2/1984 | Japan. |
| 2 202 912 | 10/1988 | United Kingdom. |

*Primary Examiner*—Khoi Q. Ta
*Assistant Examiner*—Peter T. Kwon
*Attorney, Agent, or Firm*—Oliff & Berridge

[57] ABSTRACT

An automatic transmission control apparatus has a vehicle speed detector, an accelerator pedal operation detector, a brake pedal operation detector, a clutch hydraulic servo that is neutral-controlled, a brake hydraulic servo that is hill holding-controlled, and a control device for controlling the fluid pressure supplied to the two servos. The control device selectively changes the start timing of the fluid pressure supply control. If it is determined that the vehicle is stopped and that the vehicle is not on an uphill, the control device causes a pressure reducing device and a pressure supplying device to simultaneously start reducing the fluid pressure supply to the clutch servo and supplying fluid pressure to the brake servo, respectively. If it is determined that the vehicle is on an uphill, the control device causes the pressure supplying device to start supplying fluid pressure to the brake servo and, after a predetermined time period, causes the pressure reducing device to start reducing the fluid pressure supply to the clutch servo.

5 Claims, 8 Drawing Sheets

|   |   | Clutch | | | Brake | | | | One-Way Clutch | | |
|---|---|---|---|---|---|---|---|---|---|---|---|
|   |   | C1 | C2 | C3 | B1 | B2 | B3 | B4 | F1 | F2 | F3 |
|   | R | × | ○ | × | × | × | ○ | ○ | × | × | × |
|   | N | × | × | × | × | × | × | ○ | × | × | × |
| D | 1ST | ○ | × | × | × | × | (○) | ○ | × | ○ | ○ |
| D | 2ND | ○ | × | × | ○ | ○ | × | ○ | ○ | × | ○ |
| D | 3RD | ○ | × | ○ | ○ | ○ | × | × | ○ | × | × |
| D | 4TH | ○ | ○ | ○ | × | ○ | × | × | × | × | × |

AUTOMATIC TRANSMISSION CONTROL APPARATUS

BACKGROUND OF THE INVENTION

1. Field of the Invention

The invention relates to an automatic transmission control apparatus and, more particularly, to a control apparatus for performing the neutral control and the hill holding control of the transmisson.

2. Description of the Related Art

A typical automatic transmission employs a hydraulic power transmission apparatus and a speed changing apparatus. When a drive range is selected, the hydraulic power transmission apparatus is brought into a state for transmitting rotation by a fluid, and the speed changing apparatus is brought into a state for transmitting rotation by a mechanical connection. When the vehicle is stopped by wheel braking, with these apparatuses being in the above-mentioned rotation transmitting state, the speed changing apparatus is stopped while remaining in the rotation transmitting state, so that the rotation from the engine is idled by the fluid slipping in the hydraulic power transmission apparatus, thus producing a drive force loss corresponding to the slipping of the fluid. To avoid such a drive force loss, so-called neutral control is performed to release a clutch provided in the speed changing apparatus to a released state where the clutch is nearly engaged so that the speed changing apparatus is disconnected from the drive force, for example, when the vehicle is stopped while the drive range has been selected. This control reduces the engine load for the fluid slipping in the hydraulic power transmission apparatus, thus reducing the drive force loss and improving fuel economy.

However, if the neutral control is performed, the creep force achieved by drive force transmission by means of the fluid provided in the hydraulic power transmission apparatus will not occur. Therefore, the vehicle stopped on an upward slope or the like will move backward instantly when the brake device for holding the vehicle on a slope or the like is released. To overcome such a problem, so-called hill holding control may be performed to inhibit the wheel-driven reverse rotation of the speed changing apparatus, thus preventing the vehicle from moving backward. This control establishes a state for inhibiting the reverse rotation of the speed changing apparatus by engaging a specific brake provided in the speed changing apparatus to lock the one-way clutch.

A conventional technology employing the neutral control and the hill holding control is disclosed in, for example, Japanese patent application laying-open No. SHO 59-29861. The disclosed technology comprises a vehicle speed sensor that produces an output upon detecting a vehicle speed equal to or less than a predetermined speed, and a stopping operation detecting sensor that produces an output when detecting operation of devices for stopping the vehicle. Upon detecting a condition where the two sensors have produced outputs, a controller outputs a signal to an electromagnetic means to release the input clutch and engage the brake. In this technology, the neutral control and the hill holding control are started when three signals have been output indicating operation of the braking device, release of the accelerator pedal and a vehicle speed equaling substantially zero.

When on a congested uphill road, a driver frequently repeats depression of the accelerator pedal and depression of the brake pedal, causing repeated performance of the neutral control and the hill holding control. Since the conventional technology simultaneously performs the neutral control and the hill holding control upon detecting the three signals mentioned above, a weak depressing force applied to the foot brake pedal may lead to descending backward movement of the vehicle. More specifically, if the two controls of the automatic transmission are performed simultaneously, engagement of the brake for the hill holding control is delayed by the piston stroke of the hydraulic servo performed for the brake engagement, so that the clutch release, which does not require such piston stroke, will precede the brake engagement. Thus, a transient event where neither the creep force provided by the clutch engagement nor the resisting force against descending backward movement of the vehicle provided by the hill holding control will occur. In such a circumstance, the vehicle on an uphill road moves backward, that is, the vehicle speed is no longer substantially zero, so that the two controls are removed. Then, the creep force acts to stop the vehicle despite a weak depressing force applied to the foot brake pedal. The conditions for starting the two controls are thus established again, and the controls are restarted, thus leading to repeated backward movements of the vehicle.

It may be considered that this event can be prevented by first starting the hill holding control and then starting the neutral control after the elapse of a predetermined time period corresponding to the piston stroke of the brake hydraulic servo. However, such constant delay of the start timing of the neutral control will reduce the duration of performance of this control, reducing the advantage of the neutral control, that is, fuel economy improvement.

SUMMARY OF THE INVENTION

Accordingly, it is a first object of the invention to prevent the above-mentioned repeated backward movements of a vehicle on an upward slope by determining the road conditions using a simple arrangement and selectively changing the starting timings of the neural control and the hill holding control.

A second object of the invention is to properly cancel a determination that the vehicle is on an upward slope in the above-mentioned control.

Normally, the accelerator pedal and the foot brake pedal are operated by using a right foot when driving a vehicle. However, some drivers operate the accelerator pedal and the foot brake pedal using the right and left feet, respectively. Such both-pedal operation may be performed in order to reduce the force required to depress the brake pedal when the vehicle is on a steep uphill road. While the brake pedal is depressed, the accelerator pedal is slightly depressed to provide an engine output torque slightly greater than the idle torque so that a combination of or a balance between the creep force and the vehicle braking force can hold the vehicle stopped. If in such an occasion a control apparatus determines that the vehicle is on an upward slope, the control apparatus will allow for effective both-pedal operation. Accordingly, it is a third object of the invention to provide a control apparatus that enables effective both-pedal operation.

A fourth object of the invention is to optimize the timing of cancel of the uphill determination made when the both pedal operation is performed.

A fifth object of the invention is to reliably prevent the vehicle from moving backward on an upward slope by performing control that will engage the brake before release of the clutch without a failure.

According to the invention, there is provided an automatic transmission control apparatus comprising: a hydraulic power transmission apparatus for transmitting rotation from an engine to a speed changing apparatus; a clutch which, when a forward driving range is selected, is engaged to connect the hydraulic power transmission apparatus and the speed changing apparatus; a one-way clutch which is locked by engagement of the clutch to achieve a forward first speed of the speed changing apparatus; a brake which is engaged lock the one-way clutch to inhibit reverse rotation of an output shaft of the speed changing apparatus; a first hydraulic servo for engaging the clutch upon receiving fluid pressure; a second hydraulic servo for engaging the brake upon receiving fluid pressure; vehicle speed detecting means for detecting speed of a vehicle; accelerator detecting means for detecting operation of an accelerator pedal of the vehicle; brake detecting means for detecting operation of a foot brake pedal of the vehicle; and control means for controlling fluid pressure supply to the first and second hydraulic servos on the basis of signals of detection of the vehicle speed detecting means, the accelerator detecting means and the brake detecting means. The control means comprises: pressure reducing means for reducing the fluid pressure supply to the first hydraulic servo to bring the clutch to a released state in which the clutch is nearly engaged; supplying means for supplying fluid pressure to the second hydraulic servo to engage the brake; vehicle stop determining means for determining that the vehicle is stopped, if the vehicle speed is substantially zero, the accelerator pedal is released, and the foot brake pedal is depressed; uphill determining means for determining that the vehicle is on an upward slope, if after the vehicle stop determining means makes a determination that the vehicle is stopped, the determination on vehicle stop is discontinued by the vehicle speed shifting from substantially zero; and start timing changing means for, if the uphill determining means determines that the vehicle is not on an upward slope under a condition where the vehicle stop determining means determines that the vehicle is stopped, causing the pressure reducing means and the supplying means to simultaneously start reducing the fluid pressure supply to the first hydraulic servo and supplying fluid pressure to the second hydraulic servo, respectively, the start timing changing means causing the supplying means to start supplying fluid pressure to the second hydraulic servo and, after a predetermined time period, causing the pressure reducing means to start reducing the fluid pressure supply to the first hydraulic servo, if the uphill determining means has determined that the vehicle is on an upward slope.

In a second structure according to the invention, the control means further comprises canceling means for, if the accelerator detecting means detects depression of the accelerator pedal, canceling the determination made by the uphill determining means that the vehicle is on an upward slope.

In a third structure according to the invention, the uphill determining means also determines that the vehicle is on an upward slope, if after the vehicle stop determining means makes a determination that the vehicle is stopped, the determination on vehicle stop is discontinued by a condition where the foot brake pedal is depressed and the accelerator pedal is depressed while the vehicle speed remains substantially zero.

In a fourth structure according to the invention, the control means further comprises canceling means for, if the brake detecting means detects release of the food brake pedal, canceling the determination made by the uphill determining means that the vehicle is on an upward slope.

In a fifth structure according to the invention, the predetermined time period is a period lasting at least until engagement of the brake is completed.

With the initial structure of the invention described above, when the vehicle stop determining means determines that the vehicle is stopped, the pressure reducing means and the supplying means simultaneously start reducing the fluid pressure supply to the second hydraulic servo and supplying fluid pressure to the first hydraulic servo, respectively. Thus, after it is determined that the vehicle is stopped, the clutch is simply released, unless the vehicle is on an upward slope. If the vehicle is on an upward slope, a weak depressing force applied to the brake pedal will result in backward movement of the vehicle since generation of a hill holding force by engagement of the brake is delayed by the piston stroke of the second hydraulic servo so that reduction of the creep force achieved by release of the clutch precedes. Because of the speed of the vehicle moving backward, the determination on the vehicle stop will not hold. Since the brake pedal has been depressed and the vehicle speed has shifted from substantially zero while the accelerator has been released, the uphill determining means determines that the vehicle is on an upward slope. Upon discontinuation of the determination on the vehicle stop, the clutch is engaged to generate creep forces, so that the vehicle is stopped again. This time, however, since the uphill determining means has determined that the vehicle is on an upward slope, the supplying mean starts supplying fluid pressure to the second hydraulic servo and, after a predetermined time period, the pressure reducing means starts reducing the fluid pressure supply to the first hydraulic servo, so that the brake engagement will be completed by the time when the clutch release is performed. Thus, even if the brake pedal is depressed with a weak force, the clutch release will not lead to backward movement of the vehicle on an upward slope. According to this invention, determination as to an upward slope can be made by a simple structure where the apparatus detects signals regarding operation of the accelerator pedal vehicle speed and operation of the foot brake pedal. If the vehicle is not on an upward slope, the apparatus quickly releases the clutch, thus achieving the advantage of the clutch release, that is, fuel economy improvement, at a maximum level. If the vehicle is on an upward slope, the apparatus prevents the vehicle from repeating backward movements.

The second structure described above cancels the determination by the uphill determining means that the vehicle is on an upward slope, when the accelerator is depressed. Since the determination by the vehicle stop determining means that the vehicle is stopped is also canceled, the clutch will be engaged to generate creep force, thus preventing the vehicle from descending backward.

With the third construction described above, the uphill determining means also determines that the vehicle is on an upward slope, if after the vehicle stop determining means has determined that the vehicle is stopped, the accelerator pedal is depressed. This control apparatus allows for an operation in which the accelerator pedal is slightly depressed while the brake pedal is kept depressed to hold the vehicle stopped. Thus, the control apparatus prevents the vehicle from repeating backward movements even when a driver performs the above-mentioned both-pedal operation.

The fourth construction described above cancels the determination by the uphill determining means that the vehicle is on an upward slope, when the foot brake pedal is released. The control apparatus thus properly removes the hill holding control in a manner suitable to the above-mentioned both-pedal operation.

With the fifth construction described above, the clutch release is preceded by complete engeagement of the brake, that is, the clutch is released after a state where the hill holding force is readily produced has been established. Thus, the control apparatus further reliably prevents the vehicle from repeating backward movements on an upward slope.

BRIEF DESCRIPTION OF THE DRAWINGS

The foregoing and further objects, features and advantages of the invention will become apparent from the following description of preferred embodiments with reference to the accompanying drawings, wherein.

DETAILED DESCRIPTION OF PREFERRED EMBODIMENTS

Preferred embodiments of the invention will be described hereinafter with reference to the accompanying drawings.

Figure 2:
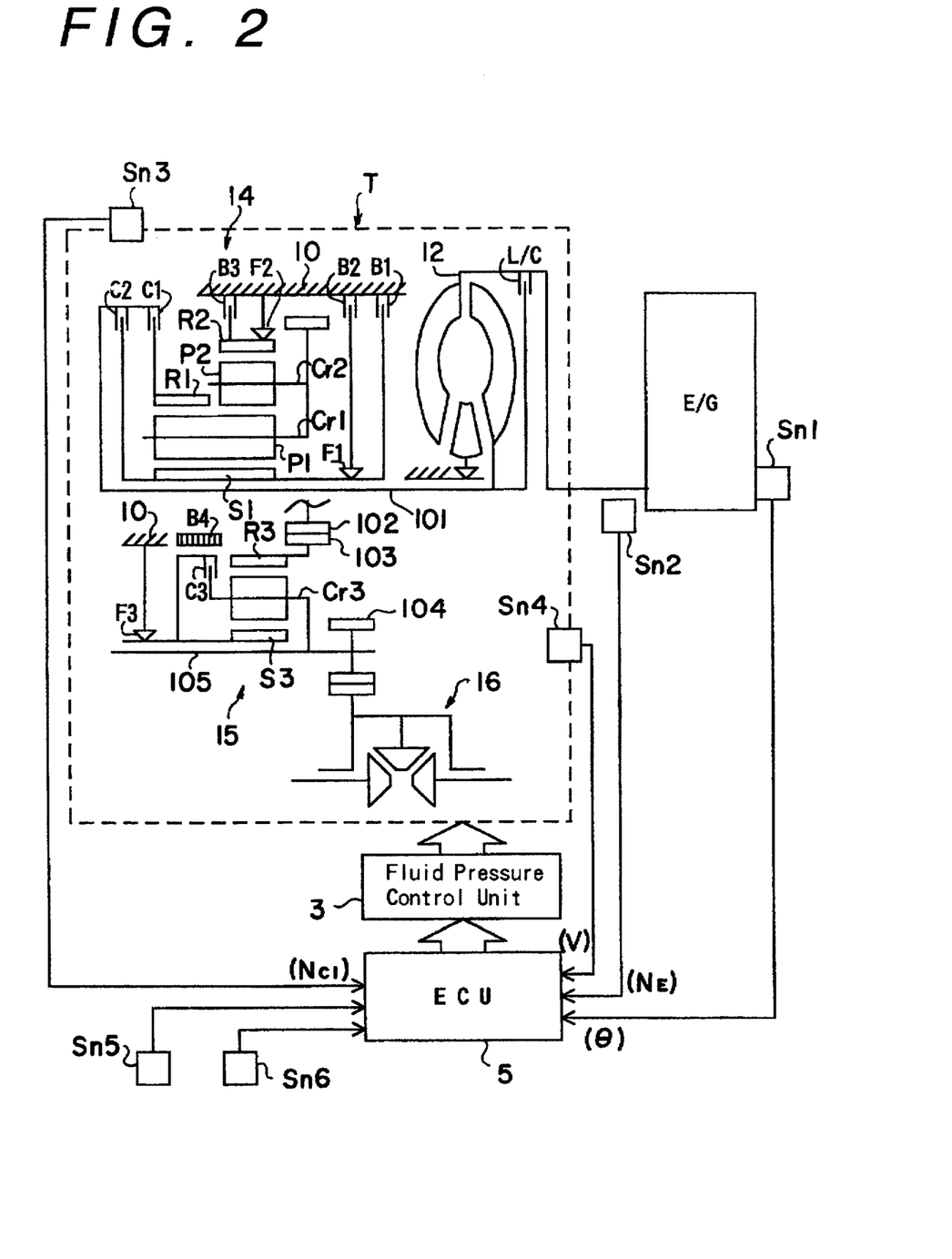
FIG. 2 is a block diagram of the overall structure of an automatic transmission according to the embodiment, illustrating the mechanical portions in schematic drawing.

Referring to FIG. 2, an automatic transmission control apparatus according to an embodiment comprises: a hydraulic power transmission apparatus 12 for transmitting rotation from an engine E/G to a speed changing apparatus 14, 15; a clutch C1 which, when a forward driving range is selected, is engaged to connect the hydraulic power transmission apparatus 12 and the speed changing apparatus 14, 15; a one-way clutch F2 which is locked by engagement of the clutch C1 to achieve a forward first speed of the speed changing apparatus 14, 15; and a brake B1 which is engaged to lock the one-way clutch F2 to inhibit reverse rotation of an output shaft 105 of the speed changing apparatus 14, 15.

Figure 1:
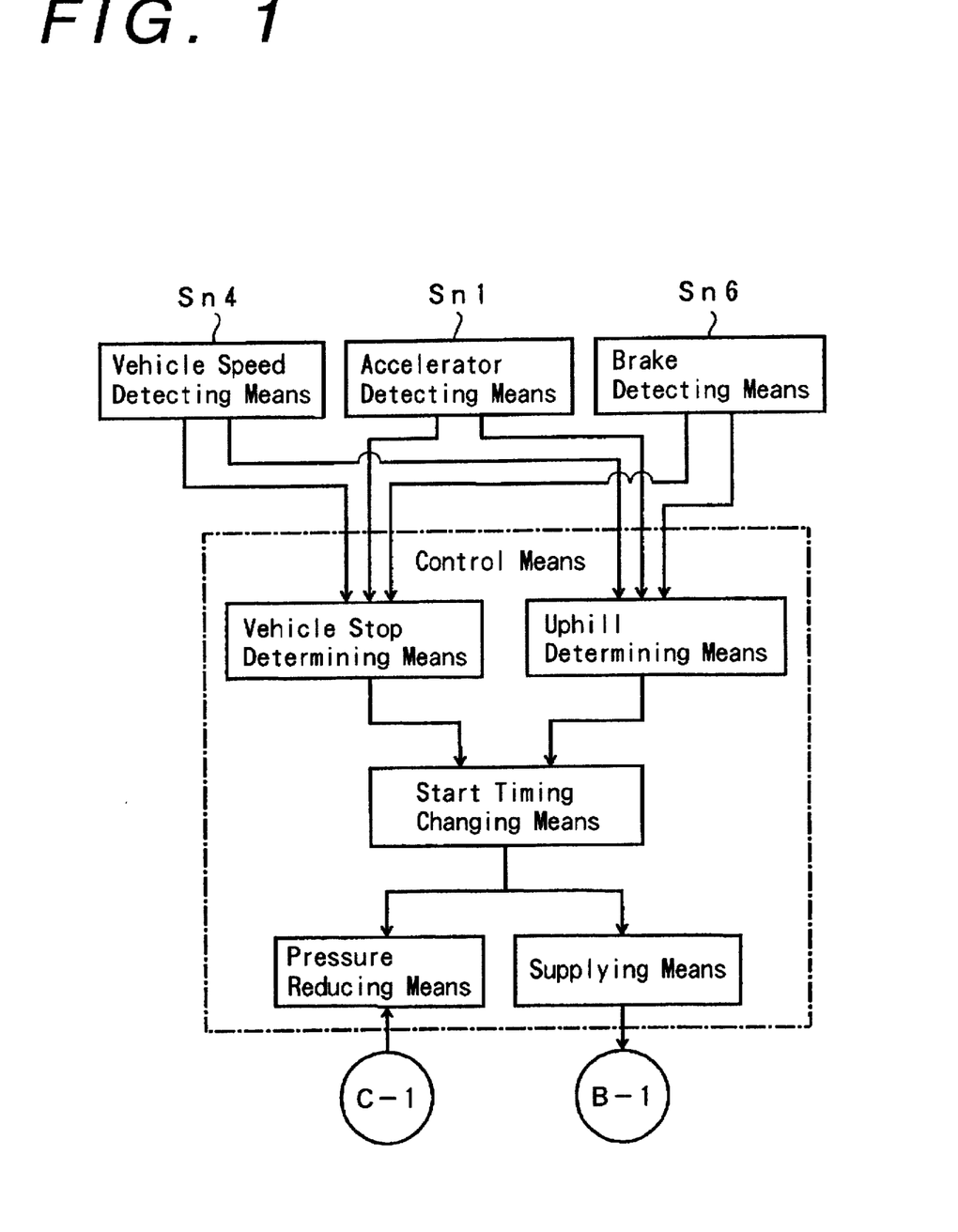
FIG. 1 is a schematic block diagram of an embodiment of the invention.

The control apparatus further comprises, as shown in the block diagram of FIG. 1: a first hydraulic servo C-1 for engaging the clutch C1 upon receiving fluid pressure; a second hydraulic servo B-1 for engaging the brake B1 upon receiving fluid pressure; vehicle speed detecting the means Sn4 for detecting speed of a vehicle; accelerator detecting the means Sn1 for detecting operation of an accelerator pedal of the vehicle; brake detecting means Sn6 for detecting operation of a foot brake pedal of the vehicle; and control means for controlling the fluid pressure supply to the first and second hydraulic servos C-1, B-1 on the basis of the signals of detection of the vehicle speed detecting means Sn4, the accelerator detecting means Sn1 and the brake detecting means Sn6.

The control means comprises: pressure reducing means for reducing the fluid pressure supply to the first hydraulic servo C-1 to bring the clutch C1 to a released state in which the clutch C1 is nearly engaged; supplying means for supplying fluid pressure to the second hydraulic servo B1 to engage the brake B1; vehicle stop determining means for determining that the vehicle is stopped, if the vehicle speed is substantially zero, the accelerator pedal is released, and the foot brake pedal is depressed; uphill determining means for determining that the vehicle is on an upward slope, if after the vehicle stop determining means makes a determination that the vehicle is stopped, the determination on the vehicle stop is discontinued by the vehicle speed shifting from substantial zero while the brake pedal remains depressed and the accelerator pedal remains released; and start timing changing means for, if the uphill determining means determines that the vehicle is not on an upward slope under a condition where the vehicle stop determining means determines that the vehicle is stopped, causing the pressure reducing means and the supplying means to simultaneously start reducing the fluid pressure supply to the first hydraulic servo C-1 and supplying fluid pressure to the second hydraulic servo B-1, respectively, the start timing changing means causing the supplying means to start supplying fluid pressure to the second hydraulic servo B-1 and, after the elapse of a predetermined time period, causing the pressure reducing means to start reducing the fluid pressure supply to the first hydraulic servo C-1, if the uphill determining means has determined that the vehicle is on an upward slope.

Various components will be described in detail. As illustrated in FIG. 2, the automatic transmission T according to this embodiment has a gear train of four forward speeds and one reverse speed for a front-engine front-drive vehicle. The automatic transmission T comprises: a torque converter 12, provided as a hydraulic power transmission apparatus according to the invention, having a lockup clutch L/C; a biaxial gear train, provided as a speed changing apparatus according to the invention, having a main speed changing unit 14 and an under drive-type planetary gear unit 15; a differential unit 16; a fluid pressure control unit 3, provided as control means according to the invention, for controlling the gear train and the lockup clutch L/C; and an electronic control unit (ECU) 5, provided as control means according to the invention, for controlling the fluid pressure control unit 3.

FIG. 2 further shows a throttle sensor Sn1 for detecting throttle opening (θ) of the engine E/G. According to the embodiment, the throttle sensor Sn1 constitutes the accelerator detecting means. FIG. 2 still further shows: an engine speed sensor Sn2 for detecting engine speed ($N_E$); a clutch C1 rotational speed sensor Sn3 for detecting rotational speed ($Nc_{C1}$) of the input clutch C1; a vehicle speed sensor Sn4 provided as vehicle speed detecting means for detecting vehicle speed (V) based on output speed; a neutral start switch Sn5 provided as range shift detecting means for detecting shift position; and a brake switch Sn6 provided as brake detecting means for detecting operation of the brake pedal. The electronic control unit 5 is a control computer that outputs control signals to the on-off solenoid valve and linear solenoid valve of the fluid pressure control unit 3 on the basis of information from the various sensors, mainly in accordance with the throttle opening (θ) and the vehicle speed (V), following the installed program.

The main speed changing unit 14 of the gear train of the automatic transmission T comprises a single pinion-type planetary gear unit and a double pinion-type planetary gear unit. The two gear units are combined by using an integrated sun gear S1 and integrating with one set of pinion gears P1 of the double pinion-type gear unit with the single pinion-type planetary gear unit, and by connecting a carrier Cr1 supporting the pinion gears P1 and a carrier Cr2 supporting the other set of pinion gears P2 of the double pinion-type gear unit. The sun gear S1 common to the two gear units of the main speed changing unit 14 is fixable to a transmission casing 10 by a brake B1, and also fixable to the casing 10 by a one-way clutch F1 and a brake B2 that are disposed in series. A ring gear R1 of the single pinion-type gear unit is connected to an input shaft 101 by the clutch C1. The sun gear S1 is connected to the input shaft 101 by a clutch C2. The input shaft 101 is connected to a turbine output shaft of the torque converter 12. The carrier Cr1, supporting the pinion gears P1 meshed with the sun gear S1, the ring gear R1 and the pinion gears P2, and the carrier Cr2, supporting the pinion gears P2 meshed with the pinion gears P1 and a ring gear R2, are connected by a counter gear 102. The ring gear R2 of the double pinion-type gear unit is fixable to the transmission casing 10 by a brake B3 and a one-way clutch F2 that are disposed in parallel.

A ring gear R3 of the under drive planetary gear unit 15 is an input element connected to the main speed changing unit 14 by the counter gears 102, 103. A carrier Cr3 and a sun gear S3 are connected by a clutch C3. The sun gear S3 is fixable to the transmission casing 10 by a one-way clutch F3 and a band brake B4 that are disposed in parallel. The carrier Cr3 is connected to an output gear 104 for transmission to the differential unit 16.

In the gear train structured as described above, in an under drive rotational state where the sun gear S3 of the under drive planetary gear unit 15 is fixed with the clutch C3 released and the brake B4 engaged, so as to achieve input to the ring gear R3 and output from the carrier Cr3, the first speed is achieved when the input transmitted to the ring gear R1 by engagement of the clutch C1 of the main speed changing unit 14 is output as rotation of the carriers Cr1, Cr2 by reaction force support of the ring gear R2 provided by engagement of the one-way clutch F2. The second speed is achieved when the input to the ring gear R1 is output as a rotation of the carriers Cr1, Cr2 while the sun gear S1 is fixed by engagement of the brake B2. The third speed is achieved when the main speed changing unit 14 is in the direct-coupled state where the clutch C2 is additionally engaged to rotate the ring gear R1 and the sun gear S1 at the same speed, so that the input rotation is directly output from the carriers Cr1, Cr2. In a direct-coupled state of the under drive planetary gear unit 15, achieved by release of the brake B4 and engagement of the clutch C3, the fourth speed is achieved. The reverse is achieved when the clutch C2 is engaged and the brake B3 is engaged to achieve input to the sun gear S1 and fixation of the ring gear R2 so that rotation of the carrier Cr2 reverses.

With this gear train, when a counter rotational drive force is applied to the output shaft 105 of the under drive-type planetary gear unit 15 and the counter gear 102 of the main speed changing unit connected thereto, by backward movement of the vehicle or the like, the brake B-1 is engaged to fix the sun gear S1 so that the one-way clutch F2 is locked to fix the ring gear R2. The pinion gears P1, P2 meshed with each other are inhibited from rotating in opposite directions relative to each other, thus inhibiting reverse rotation by counter drive force.

Figure 3:
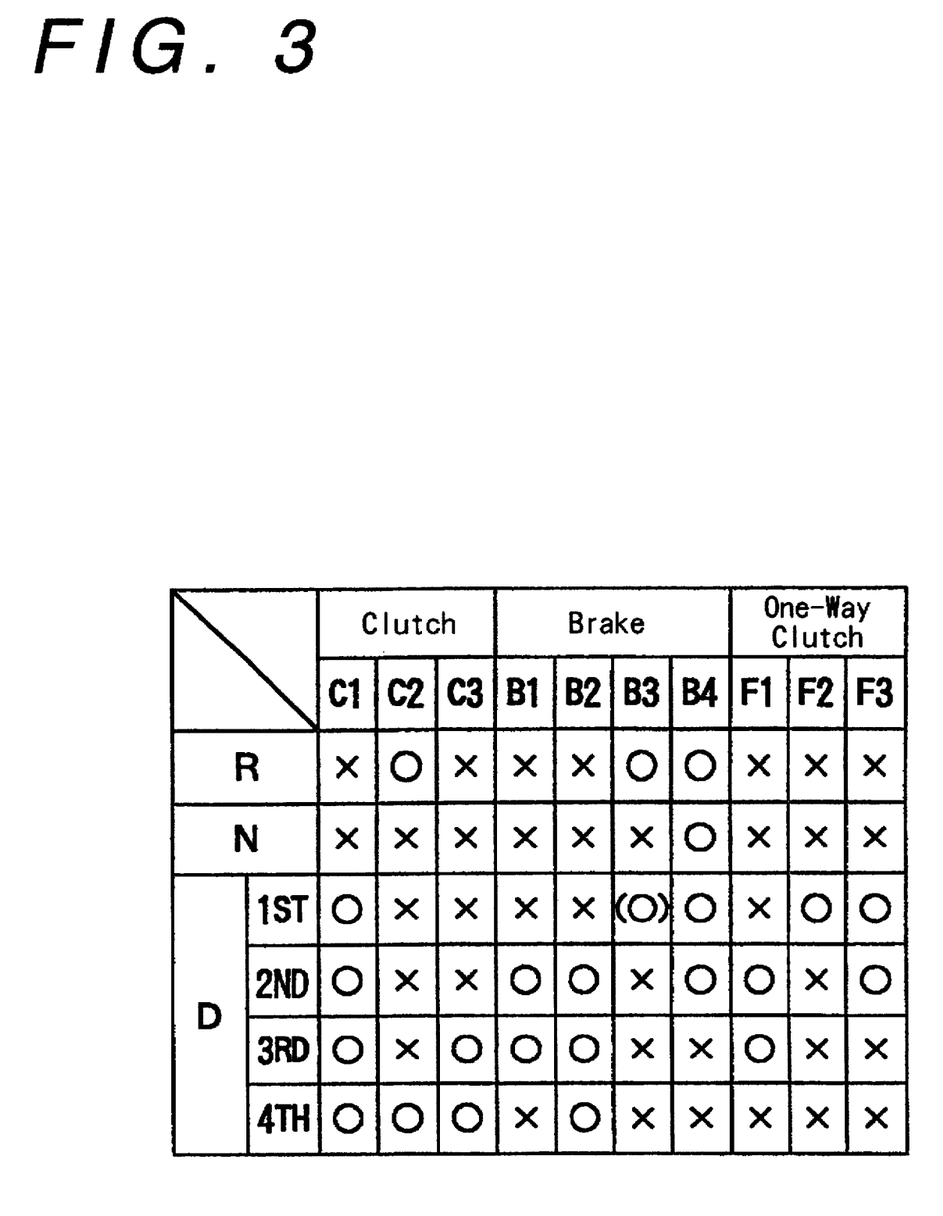
FIG. 3 is a table showing various operations of the automatic transmission.

FIG. 3 shows a table showing the relationship between the operation of the clutches, the brakes and the one-way clutches and the thereby-achieved gear speeds, that is, the first speed to the fourth speed. In the table, "R" indicates the reverse drive position; "N" indicates the neutral position; "D" indicates the forward drive shift positions; "O" indicates engagement (and indicates lock for the one-way clutch); "X" indicates release; and (O) indicates engagement effected only during engine braking.

Figure 4:
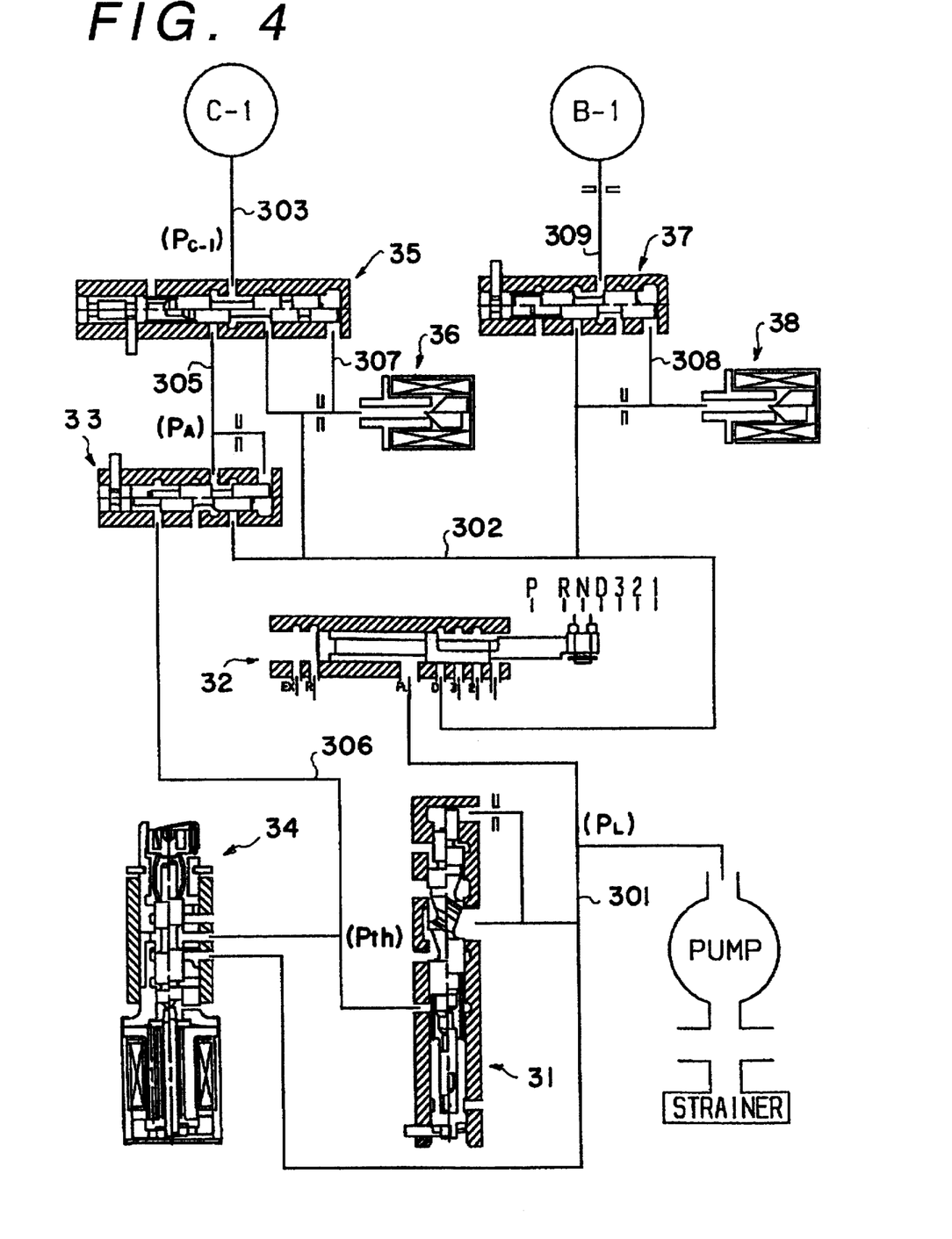
FIG. 4 is a partial circuit diagram of a fluid pressure control unit of the automatic transmission.

Referring to FIG. 4, the hydraulic circuit provided as the control means for controlling the gear train as described above comprises, similar to the hydraulic circuit of a conventional fluid pressure control apparatus, an oil pump (PUMP) as a fluid pressure source incorporated in the speed changing mechanism, various pressure regulating valves that include a primary regulator valve 31 for regulating the pressure from the oil pump to a predetermined stable line pressure ($P_L$) in accordance with the vehicle speed and the throttle opening to output a secondary pressure and a secondary regulator valve (not shown) for reducing the secondary pressure to a regulated torque converter pressure supply and outputting the remaining pressure as a lubrication pressure, the manual valve 32, various solenoid valves that include the solenoid valve 36 and a liner solenoid valve 34, various shift valves, orifices and check valves disposed in the passages connecting the various valves.

FIG. 4 is illustrates only portions of the above-described hydraulic circuit that are relevant to the invention. This circuit comprises the manual valve 32, a C-1 control valve 33 and the linear solenoid valve 34 for controlling the C-1 control valve 33, a C-1 changeover valve 35 and the solenoid valve 36 for controlling the C-1 changeover valve 35, and a B-1 changeover valve 37 and a solenoid valve 38 for controlling the B-1 changeover valve 37. The manual valve 32 is connected at its input port to a line pressure fluid passage 301 and at its output port to a D range pressure fluid passage 302 so as to output a D range pressure, that is, a line pressure ($P_L$) in accordance with current throttle opening (θ), when the forward driving range, that is, the D range, is selected.

The C-1 control valve 33 is a secondary pressure-operated pressure reducing valve that receives at the opposite ends of the spool the throttle signal pressure ($P_{th}$) and the feedback pressure of the regulated fluid pressure ($P_A$) to the clutch C1 to adjust the openings of the output, input and drain ports. The input port is connected to the D range pressure fluid passage 302. The output port is connected to a regulated fluid pressure output fluid passage 305. The signal port is connected to a throttle signal pressure fluid passage 306. The feedback port is connected to the regulated fluid pressure output fluid passage 305 through an orifice. The linear solenoid valve 34 outputs the throttle signal pressure ($P_{th}$) provided by reducing the line pressure ($P_L$) as the basic pressure, on the basis of the signal from the electronic control unit 5. The throttle signal pressure ($P_{th}$) is supplied to the primary regulator valve 31 and the C-1 control valve 33 through the throttle signal pressure fluid passage 306. Thus, the C-1 control valve 33 and the linear solenoid valve 34 function as part of the pressure reducing means for reducing the fluid pressure supply ($P_{C-1}$) to the hydraulic servo C-1 to a regulated fluid pressure ($P_A$) on the basis of the signal from the electronic control unit 5.

The C-1 changeover valve 35 is a spool-type changeover valve that selectively communicates the output port connecting to the hydraulic servo C-1 for the clutch C1 with the input port connecting to the regulated fluid pressure output fluid passage 305 or the input port connecting to the D range pressure fluid passage 302. The C-1 changeover valve 35 is switched by a solenoid signal pressure opposing the spring force acting on an end of the spool. The solenoid valve 36 is a normal open-type on-off valve that closes upon receiving the solenoid signal from the electronic control unit 5. The solenoid valve 36 drains the fluid pressure from a solenoid signal pressure fluid passage 307 connecting to the line fluid passage 302 through an orifice and stops draining the pressure. Thus, the C-1 changeover valve 35 and the solenoid valve 36 perform the changeover function to be selectively changed over the supplying position (indicated in the lower half of the illustration of each of the valves in the drawing) for supplying the line pressure ($P_L$) to the hydraulic servo C-1 of the clutch C1 through the fluid passage 303 and discharge position (indicated in the upper half of the illustration of each of the valves in the drawing) for reducing the fluid pressure supply ($P_{C-1}$) to the regulated fluid pressure ($P_A$), on the basis of the signal from the electronic control unit 5. The C-1 changeover valve 35 and the solenoid valve 36 cooperate with the C-1 control valve 33 and the linear solenoid valve 34, constituting pressure reducing means according to the invention.

The B-1 changeover valve 37 is a spool-type changeover valve having an input port connecting to the D range pressure fluid passage 302, an output port connecting to the hydraulic servo B-1 via an orifice, and a drain port. The B-1 changeover valve 37 is switched by a solenoid signal pressure opposing the spring force acting on an end of the spool. The solenoid valve 38 is a normal open-type on-off valve that closes upon receiving the solenoid signal from the electronic control unit 5. The solenoid valve 38 drains the fluid pressure from a solenoid signal pressure fluid passage 308 connecting to the D range pressure fluid passage 302 through an orifice and stops draining the pressure. Thus, the B-1 changeover valve 37 and the solenoid valve 38 perform the function of supplying means according to the invention able to be selectively change over the supplying position (indicated in the upper half of the illustration of each of the valves in the drawing) for supplying the line pressure ($P_L$) to the hydraulic servo B-1 of the brake B-1 through the fluid passage 309 and the discharge position (indicated in the lower half of the illustration of each of the valves in the drawing) for connecting the fluid passage 309 to the drain, on the basis of the signal from the electronic control unit 5.

Figure 5:
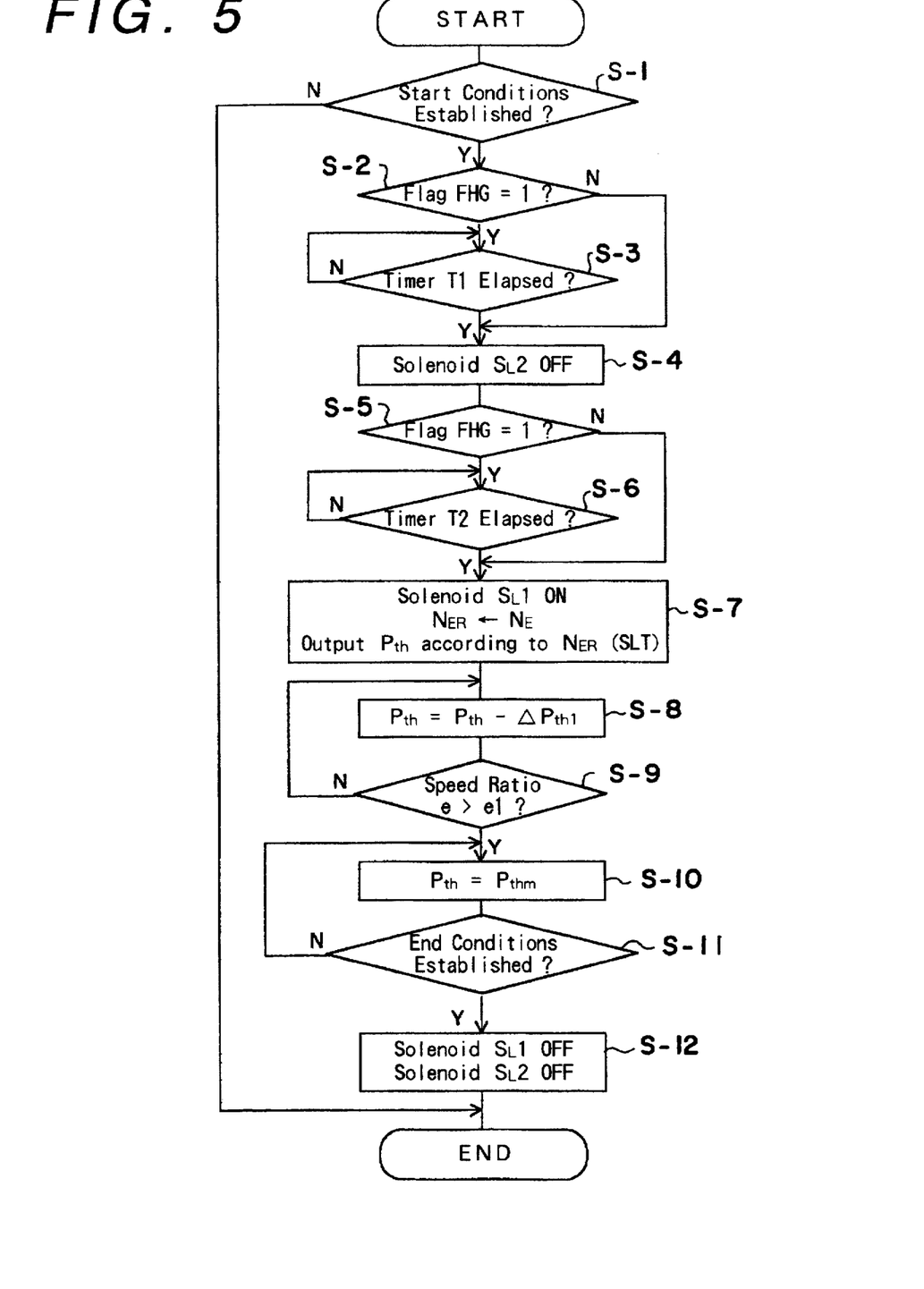
FIG. 5 is a flowchart illustrating a main control flow of the control apparatus according to the embodiment.

The thus structured hydraulic circuit, as shown in FIG. 4, is controlled by the electronic control unit 5 provided as the control means. Referring to the flowchart shown in FIG. 5, illustrating the main control flow, the first step S-1 determines whether neutral control start conditions have been established. Step S-1 makes an affirmative determination if the following conditions are established: the D range is selected, on the basis of the signal from the neutral start switch Sn5; the vehicle speed is zero; the throttle opening is zero; and the brake switch is on. Step S-1 corresponds to vehicle stop determining means according to the invention. Then, step S-2 checks a flag (FHG) to determine whether the vehicle is on an upward slope. This step corresponds to uphill determining means according to the invention, and the setting and canceling of the flag (FHG) will be described later. Since, when it has been determined that the vehicle is on an upward slope, the start conditions will be frequently established, step S-3 performs time measurement by a timer to wait for the elapse of a predetermined time period in order to prevent hunting. Regardless of the result of the flag checking in step S-2, step S-4 starts the hill holding control.

Step S-4 outputs a solenoid signal $S_L2$ to close the solenoid valve 38. Thereby, in the fluid pressure circuit, the fluid pressure drain of the solenoid signal pressure fluid passage 308 is inhibited; the B-1 changeover valve 37 is shifted to the supplying position; and fluid pressure supply to the hydraulic servo B-1 is started to start the piston stroke. Then, step S-5 checks the flag (FHG) again to determine whether the vehicle is on an upward slope. If step S-5 determines that the vehicle is on an upward slope, step S-6 performs time measurement by a timer. When the timer value becomes T2, the following steps enter the neutral control operation to bring the clutch C1 to a released state where the clutch C1 is nearly engaged, in accordance with the input torque (engine speed). Conversely, if step S-5 determines on the basis of the flag (FHG) that the vehicle is not on an upward slope, the operation skips the time measurement and goes to step S-7.

Step S-7 outputs a solenoid signal $S_L1$ to close the solenoid valve 36, sets the current engine speed ($N_E$) as the engine speed ($N_{ER}$) at the start of the control, and outputs a solenoid signal (SLT) so that the linear solenoid valve 34 will output a signal pressure ($P_{th}$) in accordance with the engine speed ($N_{ER}$). Then, step S-8 reduces by a predetermined amount ($\Delta P_{th1}$) the signal pressure ($P_{th}$) to reduce the fluid pressure supply ($P_{C-1}$) to the hydraulic servo C-1 with a predetermined gradient. The predetermined amount ($\Delta P_{th1}$) is preset so that the fluid pressure will decrease with the predetermined gradient. By this operation, the C-1 changeover valve 35 is switched to the discharge position, and the pressure reduction is performed while the C-1 control valve 33 is regulating fluid pressure. Then, step S-9 determines whether the clutch C1 is engaged. This determination is based on determination as to whether the input-output speed ratio e of the torque converter exceeds a predetermined value $e_1$, on the basis of the detection signals from the engine speed sensor Sn2 and the clutch rotational speed sensor Sn3. If step S-9 makes an affirmative determination, step S-10 controls the throttle pressure ($P_{th}$) to a value ($P_{thm}$) to bring the clutch C1 to the nearly-engaged released state. This released state is maintained until, in step S-11, any of the following control end conditions is established: the vehicle speed is not zero; the throttle opening is not zero; or the brake switch is off. When any of the end conditions is established, the last step S-12 turns off the solenoid signals ($S_L1$), ($S_L2$). Thus, the C-1 changeover valve 35 is switched to the line pressure ($P_L$) supplying position, and the B-1 changeover valve 37 is switched to the fluid pressure discharge position, thus ending the neutral control and the hill holding control. As a result, the clutch C1 is engaged and the automatic transmission returns to the normal D range state.

Figure 6:
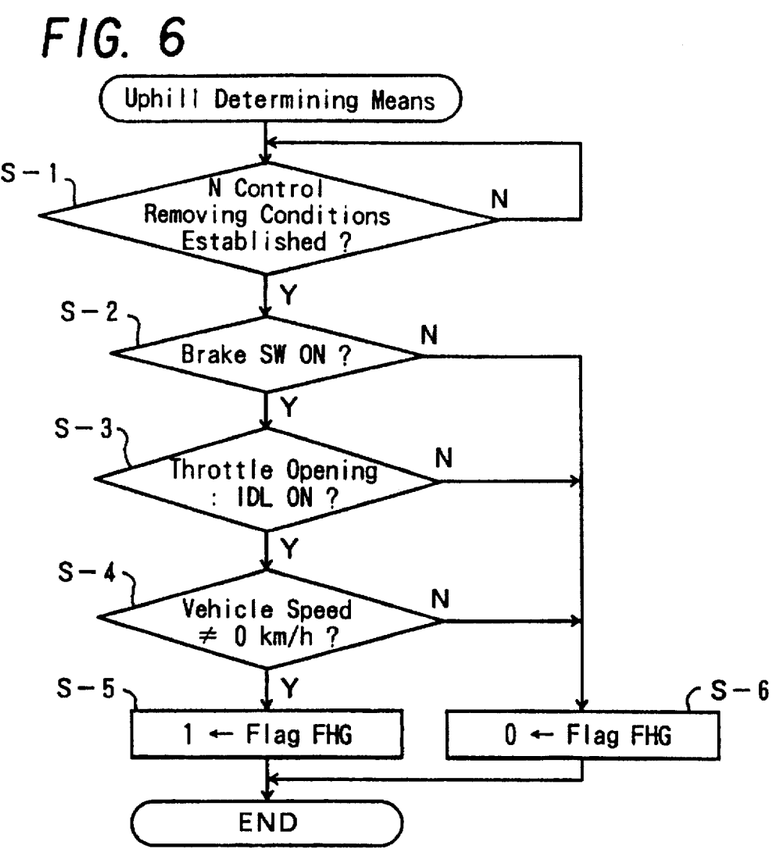
FIG. 6 shows a flowchart illustrating an example of a flag setting operation for uphill determination indicated in the main flowchart shown in FIG. 5.
Figure 7:
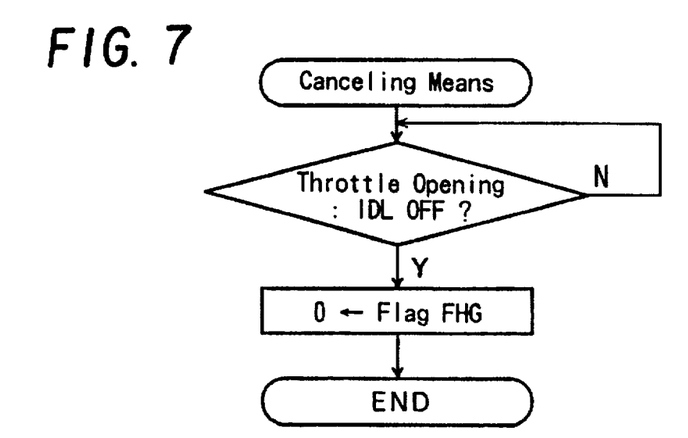
FIG. 7 is a flowchart illustrating a flag setting canceling operation for the uphill determination.

Two ways of setting the flag FHG used as means for making an uphill determination in the control according to the main flowchart described above can be used. In a first way is illustrated in FIG. 6, step S-1 determines whether the neutral control removing conditions are established. In the case where step S-1 has made an affirmative determination, only when step S-2 confirms that the brake switch is on; step S-3 determines that the throttle opening is zero (IDL ON); and step S-4 determines that the vehicle speed is not zero, it is determined that the neutral control is removed by movement of the vehicle, so that step S-5 sets the flag (FHG) indicating that the vehicle is on an uphill. "FLAG (FHG) →0" in step S-6 indicates cancellation of the setting of the flag. If the flag is canceled, the hill holding control and the neutral control are simultaneously started according to the main flow. According to the first manner, canceling means cancels the flag setting if the detected throttle opening shifts from zero during a period from the removal of the neutral control until the next start of the neutral control in the main flow, as illustrated in FIG. 7.

Figure 8:
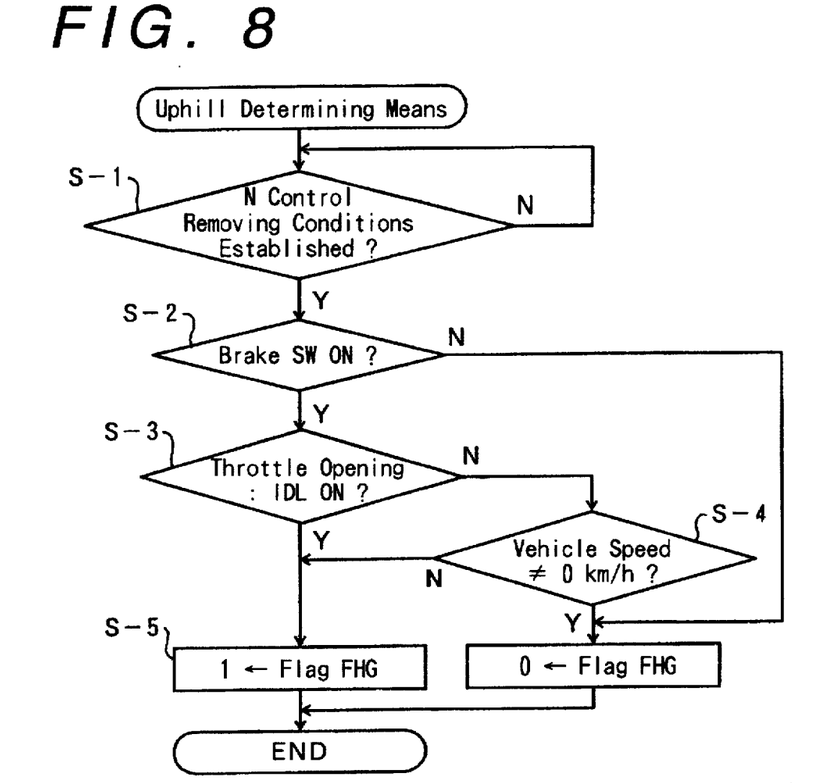
FIG. 8 is a flowchart illustrating another example of the flag setting operation for the uphill determination indicated in the main flowchart shown in FIG. 5.
Figure 9:
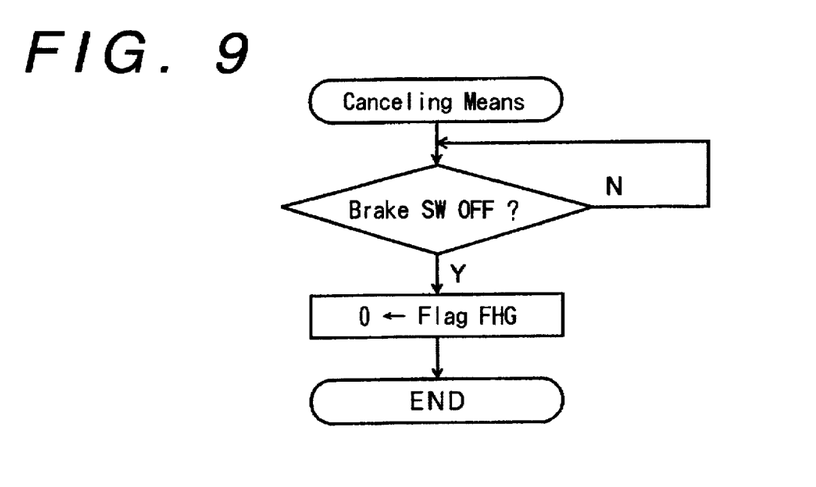
FIG. 9 is a flowchart illustrating another example of the flag setting canceling operation for the uphill determination.

In the second way illustrated in FIG. 8, if step S-1 makes an affirmative determination as to whether the neutral control removing conditions are established; step S-2 determines that the brake switch is on; and step S-3 determines that the throttle opening is zero, it is then determined that the foot brake pedal is depressed and the accelerator pedal is released. Then, step S-5 sets the flag. If step S-3 determines that the throttle opening is not zero but step S-4 determines that the vehicle speed is zero, it is determined that the foot brake pedal and the accelerator pedal are simultaneously depressed to hold the vehicle stopped, that is, the vehicle is kept from moving backward on an uphill by the balance achieved by the both-pedal operation. Thus, it is determined that the vehicle is on an uphill so that step S-5 sets the flag. According to the second manner, the canceling means cancels the flag setting if the brake switch is turned off, as illustrated in FIG. 9.

Figure 10A:
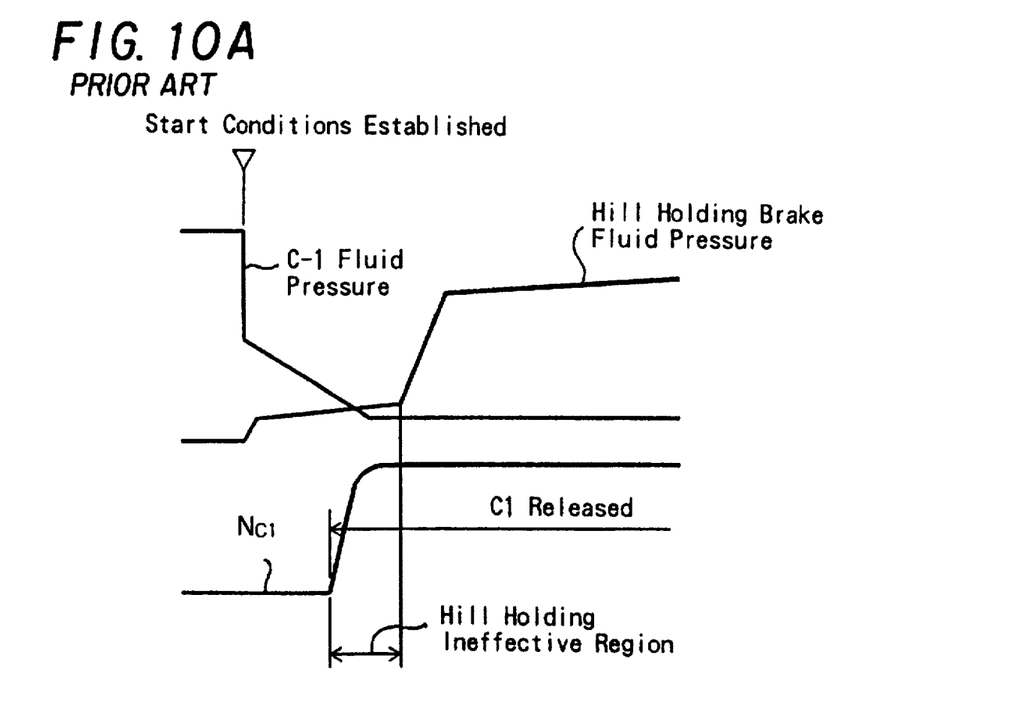
FIG. 10A shows timing charts indicating the control characteristics of a conventional control apparatus.

FIG. 10A shows a timing chart of the flow described above compared with the FIG. 10B timing chart according to the conventional control. In the conventional control as indicated in FIG. 10A the brake B1 fluid pressure gradually increases while remaining in a predetermined low pressure state during the piston stroke period following the start of the control. On the other hand, the clutch C1 fluid pressure instantly falls to a predetermined pressure simultaneously with the start of the control, and then gradually decreases. During the gradual decrease, release of the clutch C1 starts. Thus, a region where the hill holding is ineffective occurs between the start of release of the clutch C1 and the start of engagement of the brake B1.

Figure 10B:
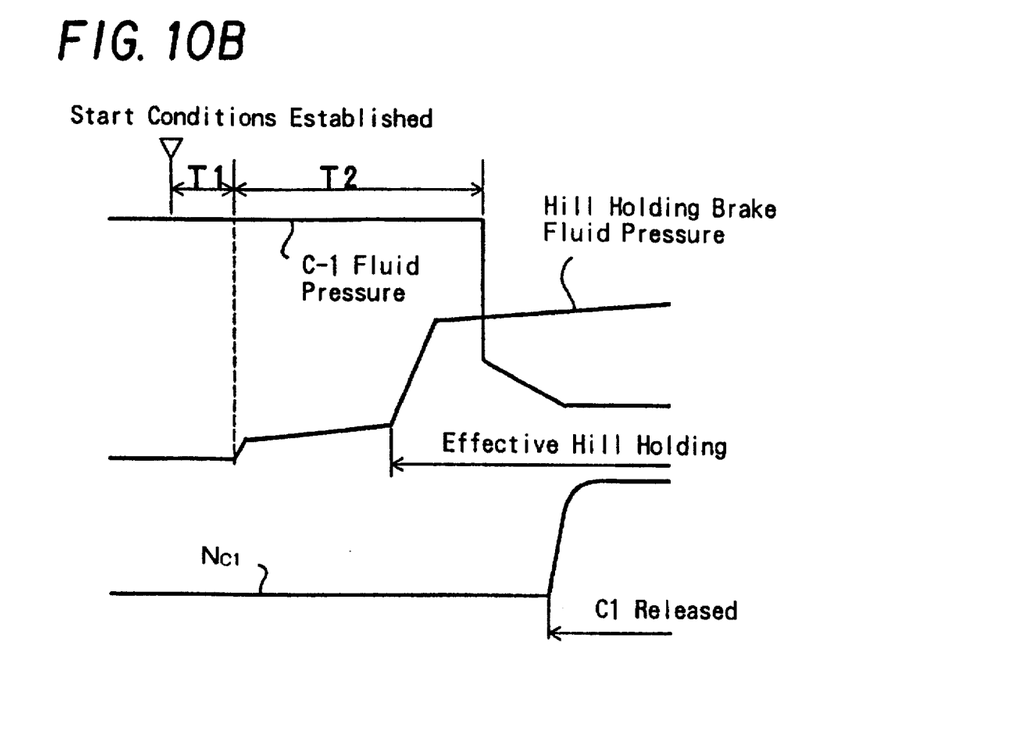
FIG. 10B shows timing charts indicating the control characteristics achieved by the automatic transmission control apparatus according to the embodiment.

In contrast, in the control according to the embodiments as indicated in FIG. 10B, the brake B1 fluid pressure gradually increases while remaining in a predetermined low pressure state during the piston stroke following the elapse of at least the timer measurement time T1. Then, the brake B1 eventually starts engaging. In a case where the uphill determination is not established during this period and the vehicle is actually not on an uphill, and, in addition, in the initial control routine where the uphill determination has not been established although the vehicle is actually on an uphill, the clutch C1 fluid pressure instantly falls to a predetermined pressure simultaneously with the start of the control, and then gradually decreases, as in the conventional control. Conversely, if the uphill determination has been established, the clutch C1 fluid pressure does not fall during the piston stroke period since the period is within the timer measurement time T2. When the timer value reaches T2, the clutch C1 fluid pressure becomes sharply reduced. Subsequently, release of the clutch C1 starts under control of the release pressure. This control thus eliminates the region where the hill holding is ineffective, in contrast with the conventional art.

To summarize, according to the embodiments, when the uphill determining means determines that the vehicle is on an upward slope, the supplying means starts supplying fluid pressure to the second hydraulic servo B-1 and, after the elapse of a predetermined time period, the pressure reducing means starts reducing the fluid pressure supply to the first hydraulic servo C-1. Thus, by the time when release of the clutch C1 is started, the brake B1 will have completed engagement. As a result, even if the brake pedal is depressed with a weak force, the clutch release will not lead to backward movement of the vehicle on an upward hill. Thus, the uphill determination can be made by using detecting means that is normally provided in a vehicle equipped with a conventional automatic transmission for detecting signals regarding operation of the accelerator pedal, the vehicle speed and operation of the foot brake pedal. If the vehicle is not on an upward slope, the control apparatus quickly releases the clutch, thus achieving the advantage of the clutch release, that is, fuel economy improvement, at a maximum level. If the vehicle is on an upward slope, the apparatus prevents the vehicle from repeating backward movements.

While the invention has been described in detail with reference to the two embodiments, the invention can be embodied with modifications of specific structural details in various ways within the spirit and scope of the invention defined in the claims. In particular, the various signal detecting means is not limited to the means described in conjunction with the embodiments. As long as the detecting means enables detection of the substantially required signals, the detecting means may be either means for directly detecting operation of the accelerator pedal, the vehicle speed and operation of the foot brake pedal, or means for detecting signals based on these pedal operations and vehicle speed changes.

What is claimed is:

1. An automatic transmission control apparatus, comprising:

a hydraulic power transmission apparatus for transmitting rotation from an engine of a vehicle to a speed changing apparatus;

a clutch which, when a forward driving range is selected, is engaged to connect said hydraulic power transmission apparatus and said speed changing apparatus;

a one-way clutch which is locked by engagement of said clutch to achieve a forward first speed of said speed changing apparatus;

a brake which is engaged to lock said one-way clutch to inhibit reverse rotation of an output shaft of said speed changing apparatus;

a first hydraulic servo for engaging said clutch upon receiving fluid pressure;

a second hydraulic servo for engaging said brake upon receiving fluid pressure;

vehicle speed detecting means for detecting a speed of the vehicle;

accelerator detecting means for detecting operation of an accelerator pedal of the vehicle;

brake detecting means for detecting operation of a foot brake pedal of the vehicle; and control means for controlling fluid pressure supply to said first and second hydraulic servos on the basis of signals of detection of said vehicle speed detecting means, said accelerator detecting means and said brake detecting means, said control means comprising:

pressure reducing means for reducing the fluid pressure supply to said first hydraulic servo to bring said clutch to a released state in which said clutch is nearly engaged;

supplying means for supplying fluid pressure to said second hydraulic servo to engage said brake;

vehicle stop determining means for determining that the vehicle is stopped, if the vehicle speed is substantially zero, the accelerator pedal is released, and the foot brake pedal is depressed;

uphill determining means for determining that the vehicle is on an upward slope, if after said vehicle stop determining means makes determination that the vehicle is stopped, said determination on vehicle stop is discontinued by the vehicle speed shifting from substantially zero; and start timing changing means for, if said uphill determining means determines that the vehicle is not on an upward slope under a condition where said vehicle stop determining means determines that the vehicle is stopped, causing said pressure reducing means and said supplying means to simultaneously start reducing the fluid pressure supply to said first hydraulic servo and supplying fluid pressure to said second hydraulic servo, respectively, said start timing changing means causing said supplying means to start supplying fluid pressure to said second hydraulic servo and, after elapse of a predetermined time period, causing said pressure reducing means to start reducing the fluid pressure supply to said first hydraulic servo, if said uphill determining means has determined that the vehicle is on an upward slope.

2. An automatic transmission control apparatus according to claim 1, wherein said control means further comprises canceling means for, if said accelerator detecting means detects depression of the accelerator pedal, canceling the determination made by said uphill determining means that the vehicle is on an upward slope.

3. An automatic transmission control apparatus according to claim 1, wherein said uphill determining means also determines that the vehicle is on an upward slope, if after said vehicle stop determining means makes the determination that the vehicle is stopped, said determination on vehicle stop is discontinued by a condition where said foot brake pedal is depressed and the accelerator pedal is depressed while the vehicle speed remains substantially zero.

4. An automatic transmission control apparatus according to claim 3, wherein said control means further comprises canceling means for, if said brake detecting means detects release of the food brake pedal, canceling the determination made by said uphill determining means that the vehicle is on an upward slope.

5. An automatic transmission control apparatus according to claim 1, wherein said predetermined time period is a period lasting at least until engagement of said brake is completed.

* * * * *